3,267,160
OXYCHLORINATION OF SATURATED ALIPHATIC HYDROCARBONS
Robert E. McGreevy and Joseph E. Milam, New Martinsville, W. Va., and William E. Makris, Shadyside, Ohio, assignors, by mesne assignments, to Pittsburgh Plate Glass Company
No Drawing. Filed Sept. 26, 1960, Ser. No. 58,162
5 Claims. (Cl. 260—654)

This application is a continuation-in-part of application Serial No. 744,048, filed June 24, 1958, now abandoned.

The present invention relates to the chlorination of hydrocarbons. More particularly the present invention relates to the oxychlorination of saturated hydrocarbons and their incompletely chlorinated derivatives.

The processes contemplated involve the reaction of gaseous hydrogen chloride and oxygen containing gas such as air and the hydrocarbon to be chlorinated while in contact with a metal halide catalyst. HCl in these reactions is oxidized to free chlorine and water and the chlorine reacts with the organic feed to produce a chlorinated hydrocarbon. In another modification of oxychlorination processes, elemental chlorine is used as the feed gas in place of gaseous hydrogen chloride. This latter process operates in a manner similar to the first except that an initial chlorination of the hydrocarbon takes place. Thus, free chlorine, an oxygen containing gas and hydrocarbon to be chlorinated are passed in contact with a metal halide catalyst. The chlorine reacts with the hydrocarbon to produce hydrogen chloride and a chlorinated product of the hydrocarbon. Hydrogen chloride produced in situ in this manner is converted by oxidation to chlorine and water and its chlorine content utilized to achieve additional chlorinations of the hydrocarbon feed material.

Chlorinations of this type while old in the art present many difficulties during operation rendering them unattractive. Thus, for example, with lower aliphatic hydrocarbon feed materials of the saturated type such as methane, ethane, propane and butane, considerable burning and/or oxidation of the hydrocarbon takes place during the oxychlorination reaction. High rates of oxidation of the hydrocarbon feed material results in a low utilization of the hydrocarbon feed and a consequent reduction in the quantity of product obtained. In addition, quite frequently low utilization of the chlorine and/or hydrogen chloride fed to the reaction zone is experienced. Still further high oxidation of the hydrocarbon feed material results in considerable elevation of temperatures within catalyst beds which result in vaporization of catalysts and serious heat removal problems as well as carbonization of organics.

According to the present invention, it is now possible to conduct oxychlorination reactions involving lower saturated aliphatic hydrocarbons and their incompletely chlorinated derivatives while at the same time considerably reducing the amount of burning normally encountered during these operations. Good yields of chlorinated hydrocarbon material are obtained and effective utilization of both the hydrocarbon feed and the chlorine containing feed are achieved. In addition, bed temperatures are effectively controlled.

Thus, it has been found that during the oxychlorination of saturated aliphatic hydrocarbons and their incompletely chlorinated derivatives in a metal halide catalyst zone that oxidation of feed hydrocarbon may be substantially reduced by introducing into the catalyst zone with the saturated hydrocarbon feed an unsaturated hydrocarbon chloride. The quantity of unsaturated chlorohydrocarbon fed to the reaction zone is regulated so that it does not exceed 30 percent by weight of the total organics fed to the reaction zone but is a quantity sufficient to reduce oxidation substantially over that which is normally encountered when no chlorinated unsaturates are added to the saturated hydrocarbon feed materials employed.

As a guide in the selection of the proper quantity of unsaturated hydrocarbon material to be employed to reduce oxidation and/or burning of the saturated aliphatic hydrocarbon feed, preliminary runs are made utilizing a saturated aliphatic hydrocarbon feed material and conducting the oxychlorination in this manner. Oxidation and/or burning during this period is measured and a hydrocarbon stream containing predominantly unsaturated aliphatic hydrocarbons containing from 2 to 4 carbon atoms is mixed with the normal aliphatic saturated hydrocarbon fed to the oxychlorination zone. Oxidation or burning of the feed is measured as the quantity of unsaturated hydrocarbons is increased in increments until a substantial reduction in the burning or oxidation of the saturated aliphatic hydrocarbon feed has been obtained. Usually, unsaturated aliphatic hydrocarbon streams fed to the oxychlorination reaction zones will vary between 3 and 20 percent by weight of the total organic materials fed to the oxychlorination reaction zone. While these weight percentages form the preferred ranges of unsaturated chlorohydrocarbon feed materials for satisfactory reduction of burning of the saturated feed material undergoing chlorination in the oxychlorination zone, it is, of course, to be understood that any quantity of unsaturated chlorohydrocarbon fed to the oxychlorination zone which will reduce substantially the burning normally encountered when saturated aliphatic hydrocarbons are oxychlorinated in a catalyst zone would be a sufficient quantity. By substantial reduction in the burning, it is to be understood that a reduction of 2 percent by weight of the saturated feed is considered a substantial reduction.

The oxychlorination process contemplated by the present invention takes place in the presence of a metal halide catalyst. The metal used in the catalyst is one of variable valence such as copper, chromium, iron and the like, and may be employed alone or in combination with other metals such as sodium, potassium, lithium, magnesium, and other alkali and alkaline earth metals. Preferably the catalysts are in the form of metal chloride salts and are impregnated on an inert material which provides considerable surface area for the process reactants to contact the catalyst contained therein. Various carriers may be employed such as, for example, silica gel alumina, kieselguhr, pumice and other well known carrier materials. A particularly suitable materials is Celite, a calcinated diatomaceous earth (Lompoc, California, diatomite) sold by the Johns-Manville Corporation, under the name Celite. This material impregnated with a cupric chloride-potassium chloride catalyst has been found particularly desirable in conducting reactions of the type herein contemplated and forms a preferred mode of conducting the oxychlorination procedures outlined herein.

A free or elemental oxygen ($O_2$) containing gas is employed in accordance with this invention. Thus, elemental oxygen ($O_2$) is found suitable for use in the process and may be employed alone or mixed with various inert diluents such as nitrogen, argon, neon, and the like. Air comprises a particularly suitable gas for supplying elemental oxygen to the process since it is easily obtained and inexpensive. Other types of oxygen containing gases, i.e., gases which contain elemental oxygen ($O_2$) therein may also be employed. Thus, oxygen enriched air, oxygen or air mixed with inert gases or vapors or mixtures of oxygen, air and inert gases or vapors may be conveniently utilized in accordance with the teachings of the present invention without impairing results in any way.

Chlorinating agents employed in accordance with the practice of this invention are elemental chlorine, gaseous HCl and mixtures of gaseous HCl and elemental chlorine. Preferably, the chlorinating agents are fed to the reactors in the anhydrous state but the observance of strict anhydrous conditions in the chlorinating agent feed is not necessary to successfully conduct the chlorinations contemplated herein.

The temperatures employed within the catalyst beds or zones themselves may be varied considerably without detrimental effect. Thus, temperatures between 325° C. and 700° C. may be employed. Preferably catalyst temperatures are maintained between about 400° C. and 650° C. Temperatures are controlled by heat exchange with a suitable medium either present in cooling coils in the catalyst beds or in jackets surrounding the reactor. A temperature differential between the catalyst and the heat exchange medium is established ranging from between 30° C. and about 375° C. Preferably the temperature differential between the heat exchange medium and the catalyst is established in a range of between about 50° C. and about 300° C.

Pressure conditions may be varied considerably without seriously interfering with the process of this invention. While it is preferred to operate the system herein described at or near atmospheric pressure for operational convenience, both superatmospheric pressures and subatmospheric pressures may be utilized if desired.

The process of the present invention may be conducted in tubular or elongated reactors; i.e., reactors of considerable length as contrasted with their internal diameter. Thus, length is between 8 to 600 times internal diameter. The diameter of the tubular reactors utilized may vary considerably without detrimental effect. Thus, tubes with internal diameters of the order of ¼ of an inch are found effective and tubes with diameters of 4 inches are also permissable. Preferably, tubular diameters of between 1 inch and 3 inches are employed. Reactors are usually fabricated of mild steel, nickel or other suitable structural metal but they may also be suitably coated on their inner walls with ceramic material if desired.

Oxychlorination procedures may also be conducted if desired in fluidized beds, thereby taking advantage of the heat transfer characteristics of such reactors to assure uniform distribution of heat throughout the reaction zone. When conducting oxychlorination procedures in a fluidized bed of given diameter, gas flow rates are correspondingly adjusted to provide adequate fluidization of the solid catalytic material placed within the bed. In general, contact times throughout fluidized bed reactors are essentially the same as those employed when a tubular or fixed bed operation is conducted.

When a gas is passed through a bed of solid material, several different conditions may be established depending upon the gas velocity, size of particles, etc. Thus, if the gas velocity is low, the bed of solids remains static; the gas simply passes through the bed pores. On the other hand, as the gas velocity is increased, at least some of the particles become dynamically suspended in the upwardly rising gas stream. As a result, the bed height expands. Such beds are termed "dynamic beds." If the gas velocity is still further increased, the particles all become suspended and the bed expands even further. Ultimately, the bed may assume a highly turbulent condition which in many ways resembles a boiling liquid. The present process may be conducted with gas velocities that provide for dynamic and fluidized beds. The exact condition requisite to establishing such bed conditions depends upon such factors as the particle size of the bed components, the gas velocity, the density of the particles, etc. Wilhelm and Kwauk, Chemical Engineering Progress, volume 44, page 201 (1948), equate the various factors necessary for fluidizing the bed, and by following the principles therein discussed, the desired bed condition may be provided. Preferably, in the instant process, fluidized beds rather than dynamic beds are employed when fixed bed operation is not desired.

The residence time of gases in catalyst zones is subject to variation without seriously affecting the results. Thus, while preferably reactant feed rates are adjusted so as to provide a residence time for reactant gases in the catalyst beds of between 0.5 to about 3 seconds, reactant gas feed rates may be adjusted to provide residence times as short as 0.2 second to as long as 10 seconds or longer and still maintain an efficient process.

Chlorinating procedures of the type encountered in the process of this invention are exothermic in nature. Removal of heat from the gas stream is thus desirable. This may be accomplished by use of an adequate heat exchange system associated with the reactors employed. By jacketing the reactors, and circulating therein a cooling medium, it is possible to obtain efficient control of bed temperatures. The maintenance of this control is accomplished by inserting thermo-regulating devices in the heat exchange medium so that a close temperature control of the medium itself is provided. A molten salt mixture of $KNO_3$, $NaNo_2$, and $NaNo_3$ constantly circulated throughout the reactor jacket has been found particularly suitable though any other heat exchange medium may be employed which will effectively operate within the range of temperature control necessary to accomplish the results desired.

The feed ratios of the various components of the feed gases reacted in the catalyst zones in accordance with this invention may be subjected to considerable variation without seriously interfering with the process. Thus, for example, the chlorinating agent employed may be fed to the system at a rate such that from between 0.5 mole to about 5 moles or even more chlorinating agent is supplied for each mole of hydrocarbon feed. Less than 0.5 mole of chlorinating agent may be utilized for each mole of hydrocarbon feed in the process of this invention but will usually result in supplying too small a quantity of chlorine to completely chlorinate all of the hydrocarbon feed. Employment of chlorinating agent in excess of 5 moles for each mole of hydrocarbon employed is likewise permissible though chlorine will be supplied in quantities greater than necessary to completely chlorinate all the hydrocarbon feed.

The rates of feed employed for the oxygen containing gas is also variable. Enough oxygen is supplied to insure oxidation of the chlorinating medium and still provide some unreacted oxygen in the exit gas stream. Considerable amounts of excess oxygen may be employed if desired, but quantities supplying more than 5 percent by volume free oxygen in the exit gas stream are not particularly beneficial. Thus, if the oxygen content of the feed gas is maintained so that between about 0.2 mole and 1.5 moles of free oxygen are supplied to the system for each mole of chlorinating agent employed, beneficial results are achieved.

Product recovery from systems conducted in accordance with this invention may be accomplished for example by carbon absorption trains, Dry Ice cold traps, and fractional distillation procedures or combinations of these procedures to separate the multitude of products present in product gases emanating from these processes. The higher the carbon content of the hydrocarbon feed employed, the more numerous the products formed and consequently the more intricate the recovery system necessary to separate product gas into its components.

The following examples are given as illustrative of the manner in which the present invention may be performed.

*Example I*

A catalyst was prepared by dissolving 441.0 grams of $CuCl_2 \cdot 2H_2O$ and 186.8 grams of KCl in 1000 milliliters of distilled water. One thousand milliliters of Florex carrier particles (a calcined fuller's earth, manufactured by the Floridin Corporation), (30–80 mesh, U.S. Sieve series), were added to the solution and allowed to soak for a period of 24 hours at ambient temperature (25° C.). The supernatant liquor (860 milliliters) was drained off and the particles dried with a Westinghouse sunlamp at a temperature of 110° C. The dried particles had a solids loading of 33.1 percent by weight of salts in solution corresponding to 7.82 percent copper, 5.48 percent potassium and 13.65 percent chloride ion by weight of impregnated carrier.

*Example II*

A reactor 6 feet long and 6 inches in internal diameter constructed of schedule 80 nickel pipe was employed. A 10 inch internal diameter mild, schedule 40 steel pipe was employed as a reactor jacket and encompassed the lower five feet of the nickel reactor. A water cooled condenser was attached to the steel jacket and the jacket was supplied with Dowtherm (a diphenyl, diphenyl oxide heat transfer medium manufactured by the Dow Chemical Corporation). The jacket pressure was controlled with a nitrogen pressure pad and the relief pressure valve set at 175 pounds per square inch gauge.

The organic feed to the reactor was passed through a steel preheater 8 feet in length and having an internal diameter of 2 inches. The heat to the preheater was supplied through a steel jacket surrounding the preheater and supplied with steam at 175 pounds per square inch gauge. Air and chlorine were preheated and vaporized respectively prior to admission to the reactor in heat exchangers. The organic feed, chlorine and air were measured and admitted to the main feed line at separate points and the mixture of gases then introduced into the reactor at the wind box. The reactor was charged with the catalyst of Example I to provide a static bed height of 50 inches.

The wind box was located in the reactor below the distributor plate and the reactor bottom which was closed. The distributor plate was made of 1/8 inch thick nickel plate 8 and one half inches in diameter and was provided with eighteen holes on a 1 and 11/32 inch triangular pitch pattern.

Gases emerging from the reactor were passed sequentially through a Karbate tube and shell heat exchanger, a Dry Ice cold bath, a Dry Ice-acetone cold bath and into a four foot packed scrubbing column, 4 inches in internal diameter and packed with 1 inch beryl saddles.

Heat for start up of the reactor was supplied by a strip heater (750 watt—240 volts) connected in parallel around the lower 3 feet of the Dowtherm jacket surrounding the reactor. Reaction temperatures were measured by thermocouples placed at points in the reactor at the distributor plate, 1 foot above the distributor plate and 3 feet above the distributor plate. Gases were fed at a rate to provide a fluidization velocity of 0.5 to 0.7 foot per second gas flow.

Utilizing the equipment above described, chlorine, 1,2-dichloroethane and oxygen as air were fed to the reactor to produce perchloroethylene and trichloroethylene. Several runs were made and in some of the runs an unsaturated chlorohydrocarbon was fed with the 1,2-dichloroethane. The conditions and results of the runs are set forth in Table I.

TABLE I

| Run | 1 | 2 | 3 | 4 |
|---|---|---|---|---|
| Reactor Pressure (pounds per square inch gauge) | 15 | 15 | 15 | 15 |
| $Cl_2/C_2$ feed ratio (molar) | 0.750 | 0.737 | 0.780 | 0.815 |
| $O_2/H_2$ feed ratio (molar) | 0.495 | 0.451 | 0.534 | 0.603 |
| Bed Temperature, ° F. (average of 3 reading) | 800 | 790 | 829 | 838 |
| Contact Time (seconds) | 9.84 | 10.27 | 10.35 | 10.4 |
| Organic feed composition | (1) | (2) | (3) | (4) |
| $Cl_2$ Utilization | 90.5 | 95.3 | 68 | 74.9 |
| Organic recovered as chlorohydrocarbons (mole percent) | 91.43 | 96.57 | 88.79 | 92.52 |
| Organic lost (mole percent) | 8.57 | 3.43 | 11.21 | 7.48 |

¹ 100% 1,2-dichloroethane.
² 6.05% Cis 1,2-dichloroethylene, 93.95% 1,2-dichloroethane.
³ 100% dichloroethane.
⁴ 9.9% Cis 1,2-dichloroethylene, 90.1% 1,2-dichloroethane.

Utilizing the reactor system of Example II, similar reductions in organic losses may be achieved in oxychlorination of other aliphatic hydrocarbons and chlorohydrocarbons such as methane, ethane, propane, 1,1,2-trichloroethane and the like with chlorine HCl or mixtures of chlorine and HCl employed as the chlorination medium.

While dichloroethylene has been specifically shown above as the unsaturated chlorohydrocarbon fed to the oxychlorination zone, it is of course to be understood that other materials may be employed in lieu thereof, such as for example trichloroethylene, perchloroethylene, allylene dichloride and other aliphatic unsaturated chlorohydrocarbons having 2 to 4 cabon atoms.

While the invention has been descibed with reference to certain specific examples, it is not intended to be so limited except insofar as appears in the accompanying claims.

We claim:

1. In the method of oxychlorinating 1,2-dichloroethane comprising reacting at oxychlorination temperature in the vapor phase 1,2-dichloroethane, oxygen and a chlorinating agent selected from the group consisting of HCl, $Cl_2$ and mixtures of HCl and $Cl_2$ in the presence of a metal halide oxychlorination catalyst to produce trichloroethylene and perchloroethylene, the improvement comprising feeding to the reaction zone cis 1,2-dichloroethylene in an amount between 5 and 30 percent by weight of the total organic feed to thereby reduce the burning of said 1,2-dichloroethane.

2. A method of oxychlorinating a member of the group consisting of saturated aliphatic hydrocarbons containing from 1 to 4 carbon atoms and their incompletely chlorinated saturated derivatives which comprises reacting at oxychlorination temperature in the presence of a copper containing oxychlorination catalyst, a mixture comprising said member, a chlorinating agent of the group consisting of HCl, $Cl_2$ and mixtures of HCl and $Cl_2$ and oxygen in an amount between 0.2 to 1.5 moles of oxygen per mole of chlorinating agent and a substantial amount up to 30 percent by weight of the organic content of said mixture of an unsaturated chlorinated aliphatic hydrocarbon containing 2 to 4 carbon atoms to thereby reduce burning of said member.

3. A method of oxychlorinating 1,2-dichloroethane which comprises reacting at a temperature between 325 and 700° C. in the presence of a copper containing oxychlorination catalyst, a mixture comprising 1,2-dichloroethane, a chlorinating agent of the group consisting of HCl, $Cl_2$ and mixtures of HCl and $Cl_2$, and oxygen in an amount of from 0.2 to 1.5 moles of oxygen per mole of chlorinating agent and a substantial amount, up to 30 percent by weight of the organic content of said mixture, of 1,2-dichloroethylene to thereby reduce burning of said 1,2-dichloroethane while producing trichloroethylene and perchloroethylene.

4. In a method of oxychlorinating saturated aliphatic hydrocarbons containing from 1 to 4 carbon atoms and their incompletely chlorinated saturated derivatives comprising reacting at oxychlorination temperature in the vapor phase a material to be chlorinated, oxygen and a chlorinating agent selected from the group consisting of HCl, $Cl_2$ and mixtures of HCl and $Cl_2$ in the presence of a metal halide oxychlorination catalyst, the improvement comprising feeding with the material to be chlorinated an aliphatic unsaturated chlorinated hydrocarbon containing from 2 to 4 carbon atoms in an amount representing less than 30 percent by weight of the total organic feed.

5. The method of claim 4 wherein said aliphatic unsaturated chlorinated hydrocarbon, the material to be chlorinated, oxygen and said chlorinating agent are mixed prior to reacting them in the presence of said metal halide oxychlorination catalyst at oxychlorination temperature.

References Cited by the Examiner

UNITED STATES PATENTS

| | | | |
|---|---|---|---|
| 2,442,324 | 5/1948 | Heitz et al. | 260—662 |
| 2,636,864 | 4/1953 | Pye et al. | 260—662 |
| 2,783,286 | 2/1957 | Reynolds | 260—659 |
| 2,847,482 | 8/1958 | Longiave et al. | 260—662 |
| 2,870,225 | 1/1959 | Cooley et al. | 260—662 |
| 2,952,714 | 9/1960 | Milam et al. | 260—662 |
| 2,957,924 | 10/1960 | Heiskell et al. | 260—662 |

LEON ZITVER, *Primary Examiner.*

ALPHONSO D. SULLIVAN, *Examiner.*

J. W. WILLIAMS, K. V. ROCKEY, *Assistant Examiners.*